Aug. 8, 1933.     L. E. STEPHENSON     1,921,642
PIPE JOINT AND METHOD OF FORMING SAME
Filed July 8, 1931     2 Sheets-Sheet 1
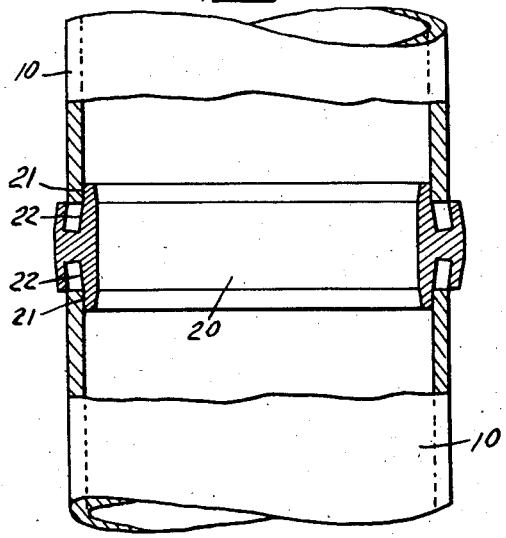
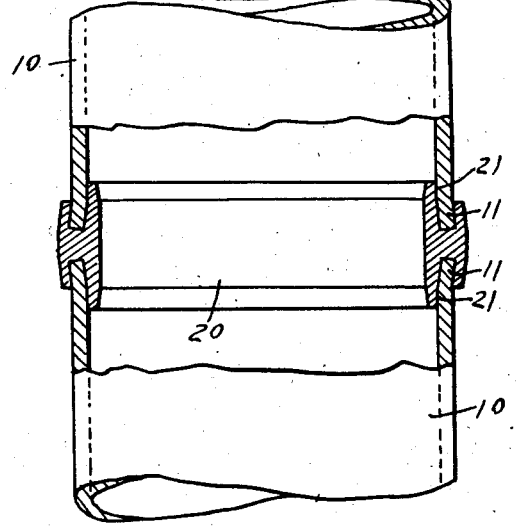
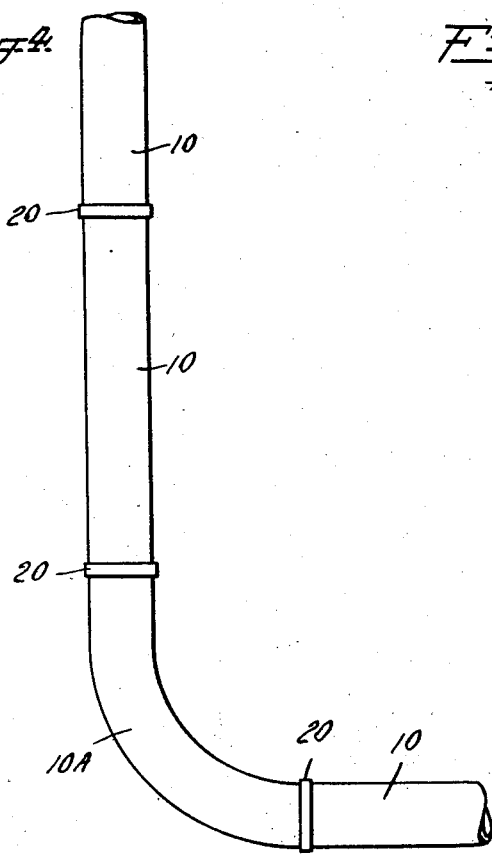
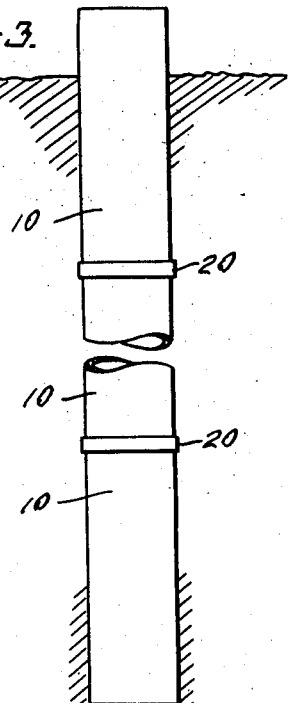
INVENTOR
Laurence E. Stephenson
BY
ATTORNEYS Aug. 8, 1933.  L. E. STEPHENSON  1,921,642
PIPE JOINT AND METHOD OF FORMING SAME
Filed July 8, 1931  2 Sheets-Sheet 2
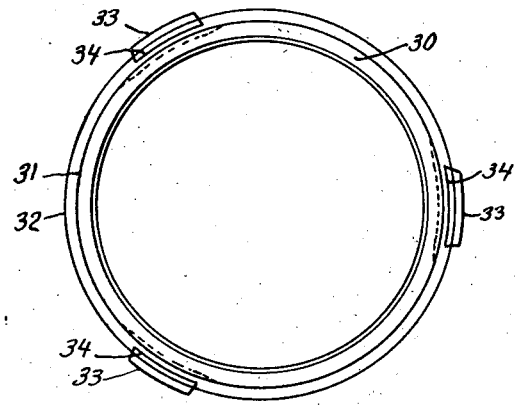
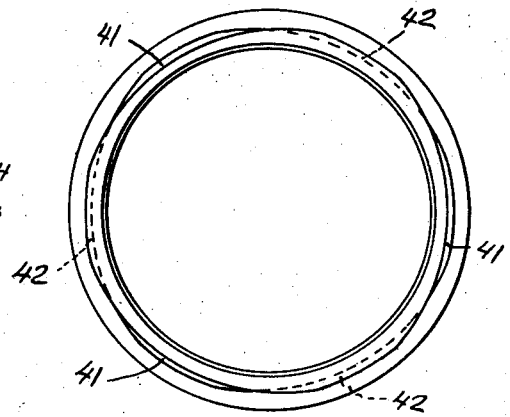
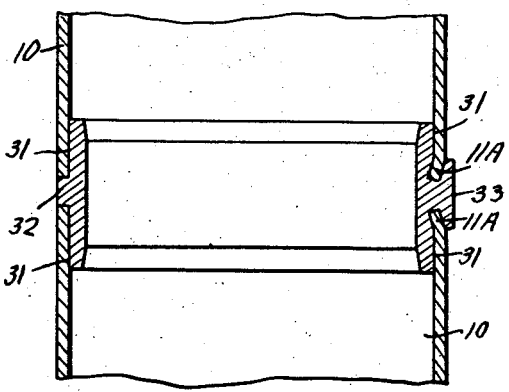
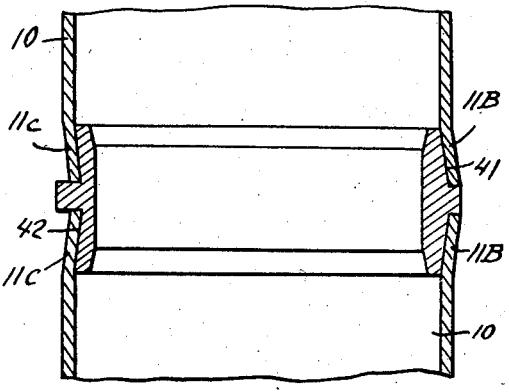
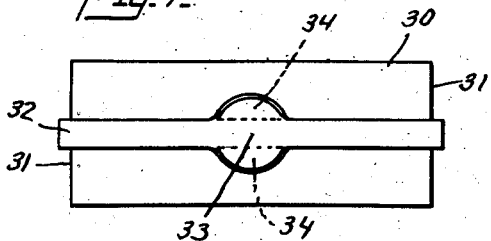
INVENTOR
Laurence E. Stephenson
BY
ATTORNEYS Patented Aug. 8, 1933

1,921,642

UNITED STATES PATENT OFFICE 1,921,642

PIPE JOINT AND METHOD OF FORMING SAME

Laurence E. Stephenson, New York, N. Y., assignor to Frederick Snare Corporation, New York, N. Y., a Corporation of New York Application July 8, 1931. Serial No. 549,461

12 Claims. (Cl. 29—148.2)

This invention relates to improvements in pipe joints and method of forming same and its object is to provide a novel arrangement for connecting adjacent ends of pieces of cylindrical pipe which will hold them in alinement and which will not impair the strength of the pipe. More specifically, this invention relates to a method of joining pipe by deforming the ends thereof in a sleeve or collar by longitudinally applied pressure and to the joint formed by this method. Other objects are to provide a joint which will hold the sections of the pipe together when they are subjected to longitudinal tension or are subjected to bending and to provide a tight joint capable of resisting internal or external pressures.

These and other objects will appear from the following specification in which I will describe the invention, the specific features of which will be pointed out in appended claims.

Referring to the drawings,

Fig. 1 is a sectional elevation of two pieces of pipe and an interposed collar assembled in position to be joined by pressure;

Fig. 2 is a similar view of the same parts in the positions and condition they assume after pressure has been applied and the joint formed;

Fig. 3 is an elevation of a tubular pile with the sections of the pipe of which it is constructed joined according to this invention;

Fig. 4 is an elevation of a part of a pipe line with the sections of the pipe similarly joined;

Fig. 5 is a plan view and Fig. 6 an elevation of a collar of modified form which also embodies this invention;

Fig. 7 is a sectional elevation of a pipe joint formed with the collar shown in Figs. 5 and 6;

Fig. 8 is a plan view of a further modified form of collar; and

Fig. 9 is a sectional elevation of a pipe joint in which the collar shown in Fig. 8 is used.

In all of the figures, 10 designates pieces of cylindrical pipe or tubing. In Figs. 1 and 2, 20 designates an annular collar which has cylindrical portions 21, 21, of approximately the same diameter as the internal diameter of the pipe 10 and inclined grooves 22, 22 of the width of the thickness of the pipe. These grooves are symmetrically disposed about the axis of the collar so that their walls form frustra of cones. Before the parts are assembled in the positions shown in Fig. 1 the grooves 22 may be filled with a plastic cement, if desired.

When longitudinal pressure is applied to the pipes, the ends of the pipes are forced into the grooves 22 thereby being deformed or outwardly belled, as shown at 11, 11 in Fig. 2. I have found that this forms a tight joint, even without the use of cement, and a joint which maintains the sections of the pipe in axial alinement and is capable of sustaining tensional strains.

This invention is particularly well adapted for use with tubular piling and in Fig. 3 such use is illustrated. The customary hammer driving provides the longitudinal pressure required to force the ends of the pipe into the annular grooves 22.

This method is also applicable for joining the sections of a pipe line such as shown in Fig. 3 in which one of the sections 10A is bent. The joint formed as described will hold the ends of the pipe together even during the bending operation.

I will now describe the modified construction which is illustrated in Figs. 5, 6 and 7. In this case a circular collar 30 is provided having cylindrical surfaces 31 which fit the inside of the pipe, separated by a band 32. At angularly spaced intervals are outwardly projecting bosses or lugs 33 back of which are undercut grooves 34 into which parts of the ends of the pipe are forced and deformed, as shown at 11A in Fig. 6. The ends of the pipe abut against the band 32.

In the modification shown in Figs. 8 and 9 the collar 40 is so constructed that the part of it which goes into the ends of the pipe has a plurality of angularly spaced outwardly inclined high spots 41 over which the ends of the pipe are bent, as shown at 11B in Fig. 9. Intermediate the high spots 41 the collar is constructed with inclined undercut portions 42 into which portions of the ends of the pipe are drawn, as shown at 11C in Fig. 9.

Several modifications have been illustrated and described for the purpose of showing that there are many constructions which come within the spirit and scope of this invention and I intend no limitations other than those imposed by the appended claims.

What I claim is:

1. A cylindrical pipe combined with a collar having an annular pocket, the bottom of which forms a shoulder and at least a part of the walls of which are inclined to the axis of the pipe with the end portion of the pipe deformed to fit said pocket and seated on said shoulder.

2. A cylindrical pipe combined with a collar having an annular pocket, the bottom of which forms a shoulder, the side of said pocket being inclined to the axis of the pipe with the end portion of the pipe deformed to fit said pocket and seated on said shoulder.

3. A pipe joint comprising two pieces of cylindrical pipe and an interposed collar, said collar having portions fitting the inside of the pipe oppositely inclined from a diameter substantially the same as that of the inside of the pipe to a different diameter, and an annular band projecting from the collar between the parts thereof of different diameter forming shoulders, with the end portions of the pipe bent into contact with said inclined portions of the collar and with the ends of the pipe abutting said shoulders.

4. A pipe joint comprising two pieces of cylindrical pipe and an interposed collar, said collar being constructed with oppositely disposed annular pockets, the bottoms of which form shoulders at least parts of which are inclined from the axis of the pipes, with the end portions of the pipe bent into said pockets and seated on said shoulders.

5. A pipe joint comprising two pieces of cylindrical pipe and an interposed collar, said collar being constructed with annular oppositely disposed annular pockets, the bottoms of which form shoulders inclined from the axis of the pipes, with the end portions of the pipe bent into said pockets and seated on said shoulders.

6. A substantially cylindrical collar for joining sections of pipe constructed with pockets, the bottoms of which form shoulders and at least parts of the walls of which are inclined from the axis of the collar.

7. A substantially cylindrical collar for joining sections of pipe constructed with annular pockets, the bottoms of which form shoulders and the walls of which are inclined from the axis of the collar.

8. A collar for joining sections of pipe, having portions adapted to fit the inside of the pipe inclined from its axis and similarly inclined portions adapted to fit the outside of the pipe and a band forming shoulders for the ends of the pipe.

9. A substantially cylindrical collar for joining sections of pipe constructed with pockets at least parts of the walls of which are inclined from the axis of the collar, and an annular band forming shoulders between said pockets.

10. A substantially cylindrical collar for joining sections of pipe constructed with annular pockets, the walls of which are inclined from the axis of the collar, and an annular band forming shoulders between said pockets.

11. The herein described method of securing a coupling member to the end of a pipe which consists of forcing the end of the pipe onto a non-cylindrical portion of the member terminating in a shoulder by longitudinally applied pressure to thereby move the end of the pipe to deform laterally the adjacent portion of the pipe.

12. The herein described method of joining pipes which consists of forcing adjacent sections of pipe onto an interposed member having non-cylindrical portions separated by shoulders by longitudinally applied pressure to thereby move the ends of the pipe to the shoulders and laterally to deform adjacent portions of the pipe sections.

LAURENCE E. STEPHENSON.